Patented July 31, 1945

2,380,830

UNITED STATES PATENT OFFICE 2,380,830

SKIN CLEANING COMPOSITION

Stuart O. Fiedler, Cincinnati, Ohio, assignor to The Drackett Company, Cincinnati, Ohio, a corporation of Ohio No Drawing. Application March 6, 1942, Serial No. 433,662

3 Claims. (Cl. 252—130)

This invention relates to detergents and more particularly to those especially adapted for the cleaning of the hands or of other portions of the human body, and has for its general object the provision of a novel and improved hand cleaner which is mild but effective in its action and which can be produced at a low cost, due to the fact that a large portion of its composition comprises residual material which is obtained as a by-product in the extraction of proteins from soybeans, and which ordinarily would go to waste.

In the preparation of active high-grade protein from oil-extracted soybean meal for use in food products, in the paper industry, and in other lines of manufacture, there is obtained a residual meal which is not soluble in the agents used. The extracting substance, whether mildly alkaline or mildly acid used to adjust the pH value to the point of optimum solution of the protein, dissolves out the greater portion of the protein and certain of the carbohydrates and upon separation of the extract by suitable means, such as centrifuging or filtering and washing, there is left a wet fibrous residue having a greatly reduced protein content and containing a substantial amount of water. This wet residual meal is not usuable as a food source and the proteins retained therein are relatively inactive and of a very definitely low grade. This waste material presents a serious disposal problem; if merely discharged from the extraction plant upon the ground, the material rots and pollutes the surrounding air, and if discharged into streams or rivers, the decayed organic material is destructive of the fish and of both the animal and vegetable life along such water courses. The alternative of providing a treating plant for getting rid of this waste matter would be a very costly expedient because of both the initial expense of such a plant and the requirement of continuous controlled operation.

A typical analysis of this residual meal, on a dry basis, is as follows:

| | Per cent |
|---|---|
| Protein | 23.5 |
| Crude fiber | 22.1 |
| Ash | 3.5 |
| Fat | None |
| Moisture | 3.5 |
| Nitrogen-free extracts (by difference) | 47.4 |
| | 100.0 |

The contents of the residues described usually run within the following ranges of proportions:

| | Per cent |
|---|---|
| Protein | 15–25 |
| Fiber | 20–25 |
| Ash | 3–5 |
| Fat | 0–0.5 |
| Moisture | 3–5 |
| Nitrogen-free extracts | 45–50 |

I have found that this residual meal can be profitably employed in conjunction with certain other compounds to provide a highly efficient hand cleaner. It is proposed to use the meal in substitution for the usual mineral abrasive materials ordinarily found in such hand cleaners, whether in powder, paste, or cake form, and the novel ingredient not only functions as a mild abrasive or rubbing agent but furnishes other properties of a chemical nature, all of which enhance the value of the cleaner with a substantial decrease in cost of production.

The conventional hand cleaning compositions containing harsh mineral abrasives are rapidly coming into disfavor in the eyes of most industrial physicians and health authorities, because of the destruction or injury of the protective epidermal layer of the skin and the consequent access of infection or of industrial poisons. The improved cleaner provided by the present invention does not have this harsh abrasive effect since it is largely composed of relatively soft particles of an organic nature.

In addition to this milder and quite harmless rubbing action, the proteinaceous portion of the meal contained in the novel hand cleaner reacts with certain alkaline material in the composition, buffering any harsh action that it might otherwise have, and at the same time forming a soap-like compound that aids in the emulsification of the dirt particles and oils in the grime and greatly facilitates their removal. As a result, it is possible to make a hand cleaner composition utilizing less soap than would be required in a cleaner not containing this meal.

Furthermore, the dispersed protein matter of the residual meal leaves a very slight coating on the hands, after washing and drying, which gives a softening and soothing effect to the skin, and which is not obtained in the case of the usual cleaners containing mineral abrasives and strong soaps and alkalies.

Obviously, the whole soybean meal from which the oil has been extracted might be used as the rubbing and buffering agent in place of the residual or waste meal, but the high grade protein of this original meal, which comprises as much as 44% thereof, is of considerably greater value in other fields, such as the manufacture of food stuffs, paper sizing, and the like. The residual meal contains substantially the same amount of fibrous material as the original oil-free meal, and it has been discovered during the conception of the present invention that the proteinaceous fraction of the waste meal is still of sufficient quality to perform the functions ascribed to it in the novel cleaning composition.

A specific example of the practice of the invention will now be described: About 70 pounds of dry residual soybean meal, ground to pass through a U. S. Standard 20 mesh screen is mixed with about 20 pounds of a relatively mild alkali in solid undissolved condition—such as the carbonates, bicarbonates, sesqui-carbonates, borates, phosphates, metaphosphates, etc., of the alkali metals—and about 10 pounds of powdered white soap—preferably a soap that lathers well in cold and hard water, for example, a coconut oil soap. The ingredients are thoroughly mixed together and the composition is ready for use. The composition may also be prepared as a paste or pressed into cake form as desired.

It may be stated that the meal may be approximately between 20 and 40 mesh but should preferably not be finer than 60 mesh, to obtain the best scouring action. Although of no particular abrasive value, the fines of the meal should be allowed to go into the mixture, since this portion reacts most quickly with the alkali to yield the protein soap, according to one of the unique features of the invention.

The formula may be varied within wide limits of proportions of the ingredients, but the following ranges have been found preferable:

| | Percent |
|---|---|
| Residual soybean meal | 50 to 70 |
| Alkaline salts | 10 to 50 |
| Soap | None to 40 |

It is to be noted that the added soap may be omitted, for some purposes, and that other protein solvents or dispersants besides alkalies may be incorporated in the mixture in cases where this dispersing function is the sole one to be attained.

The mild abrasive or scouring functions and the buffering and soap forming functions of the organic ingredient may be said to be mutually complementary or reciprocal. Stated somewhat differently, the more protein contained in this fraction and the finer it is ground, the greater the chemical action and the less the physical effect; while the less protein that the material contains and the coarser the particle, the greater the physical abrasive effect and the less the chemical factor. For a purely physical effect, a material which is absolutely chemically inert and of an optimum coarse particle size would be desired. On the other hand, if one desired a purely chemical effect, a material would naturally be selected which would combine completely with the alkali to form as much soap as possible, and it would, furthermore, be ground very finely (100 mesh or finer) to expedite the reaction.

With all this in mind, it will be understood that the soybean residual meal employed in making up the novel cleaner is exceedingly well adapted to attain chiefly an optimum abrasive effect together with a sufficiently prompt and complete chemical effect in combination with the alkaline ingredients to form a protein soap and provide a satisfactory buffering action. The formation of the protein soap affords a better total cleaning action for the same amount of added soap or detergent, and less alkaline foam for the same amount of added alkali. In addition, the slight coating of proteinaceous material left on the hands after washing and rinsing, acts as an emollient.

It will thus be understood that I have not only provided a novel and economically useful article which conforms to modern dermatological ideas and practices in connection with cleaning and protecting the hands, but have also provided an outlet for a by-product which has heretofore gone to waste and given rise to onerous disposal problems.

It is also understood that various changes and alterations may be made in the embodiments of the invention described herein without departing from the scope of the invention as defined by the subjoined claims.

Having thus described the invention, what is new and desired to be secured by Letters Patent is:

1. A composition of matter for cleaning the skin which comprises from about 50% to about 70% by weight of dried residual meal obtained as a by-product from the commercial extraction of oil, protein, and carbohydrates from soybeans, said residual meal containing approximately 15% to 25% by weight fibrous material and approximately 15% to 25% by weight unextracted protein, said meal being of a particle size not substantially greater than 20 mesh and for the most part not substantially finer than 60 mesh; and from about 30% to about 50% by weight of a mildly alkaline salt of an alkali metal in solid undissolved form.

2. A composition of matter for cleaning the skin which comprises from about 50% to about 70% by weight of dried residual meal obtained as a by-product from the commercial extraction of oil, protein, and carbohydrates from soybeans, said residual meal containing approximately 20% to 25% by weight fibrous material and approximately 15% to 25% by weight unextracted protein, said meal being of a particle size not substantially greater than 20 mesh and for the most part not substantially finer than 60 mesh; from about 10% to about 50% by weight of a mildly alkaline salt of an alkali metal in solid undissolved form; and from an appreciable amount up to about 40% by weight of soap in pulverulent form.

3. A composition of matter for cleaning the skin which comprises from about 50% to about 70% by weight of dried residual meal obtained as a by-product from the commercial extraction of oil, protein, and carbohydrates from soybeans, said residual meal containing approximately 15% to 25% by weight fibrous material and approximately 15% to 25% by weight unextracted protein, said meal being of a particle size not substantially greater than 20 mesh and for the most part not substantially finer than 60 mesh; and from about 30% to about 50% by weight of a mildly alkaline protein solvent in divided solid form.

STUART O. FIEDLER.